April 1, 1969  J. R. THOMPSON  3,436,056
DRIVE SYSTEM FOR YARDER USED IN DOUBLE MAIN LINE LOGGING
Filed Sept. 7, 1967  Sheet 1 of 4
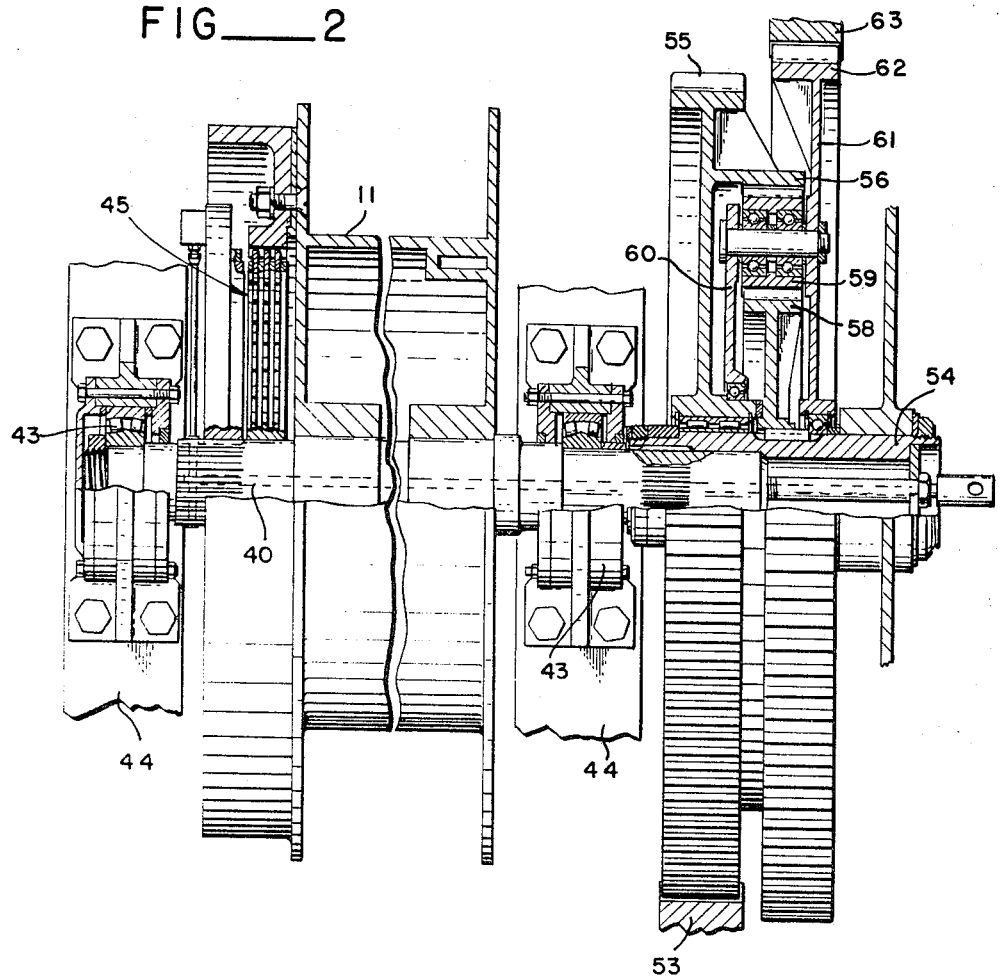
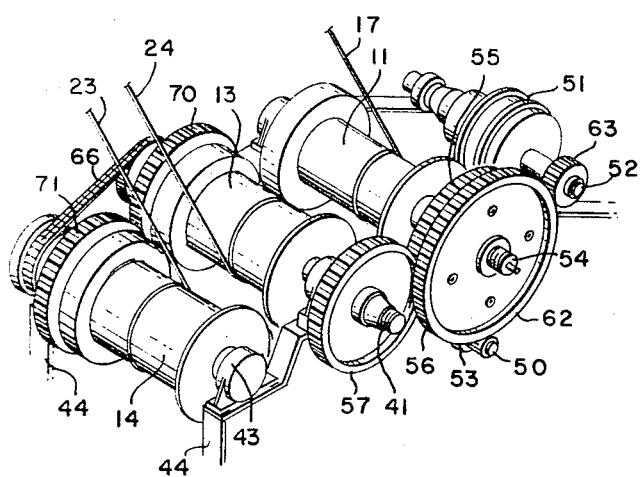
JAMES R. THOMPSON
*INVENTOR.*
BY
*ATTORNEYS*

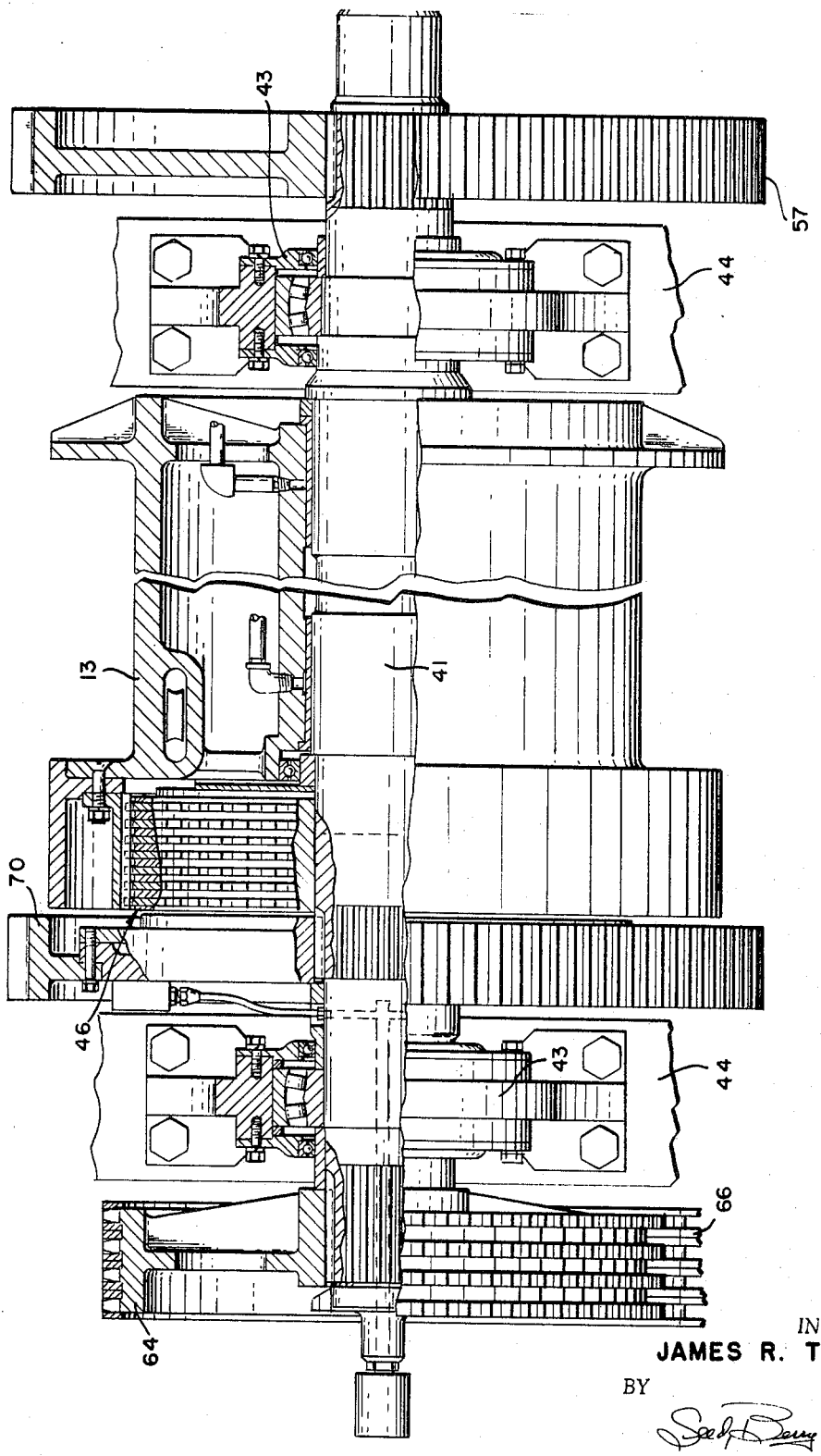

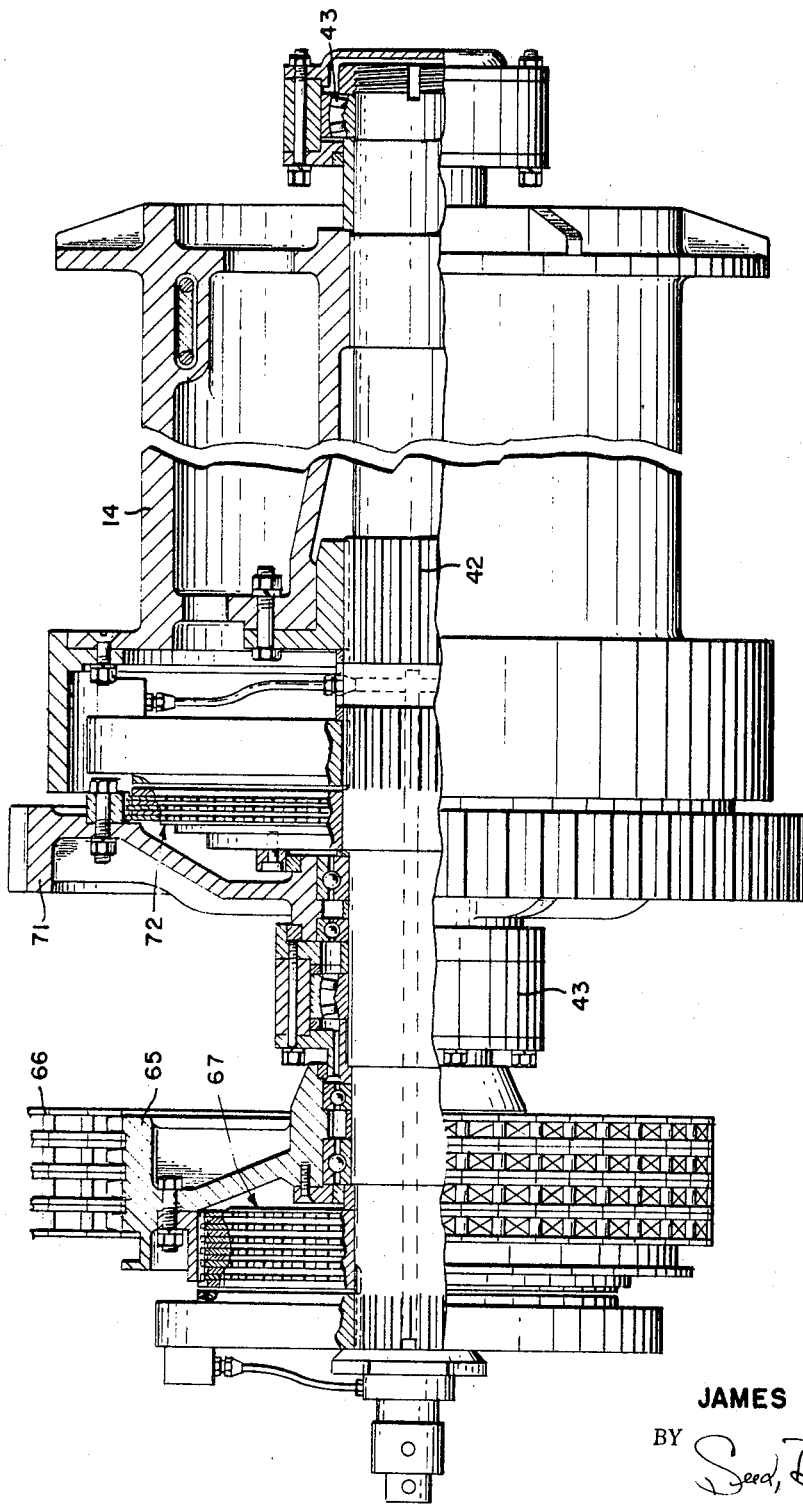
FIG_4

April 1, 1969   J. R. THOMPSON   3,436,056
DRIVE SYSTEM FOR YARDER USED IN DOUBLE MAIN LINE LOGGING
Filed Sept. 7, 1967   Sheet 4 of 4
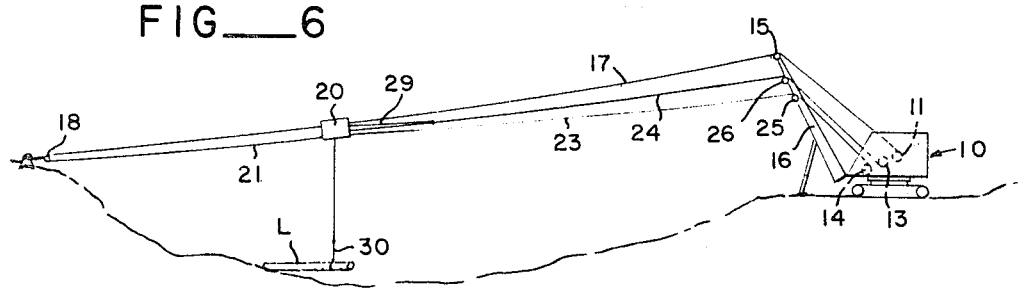
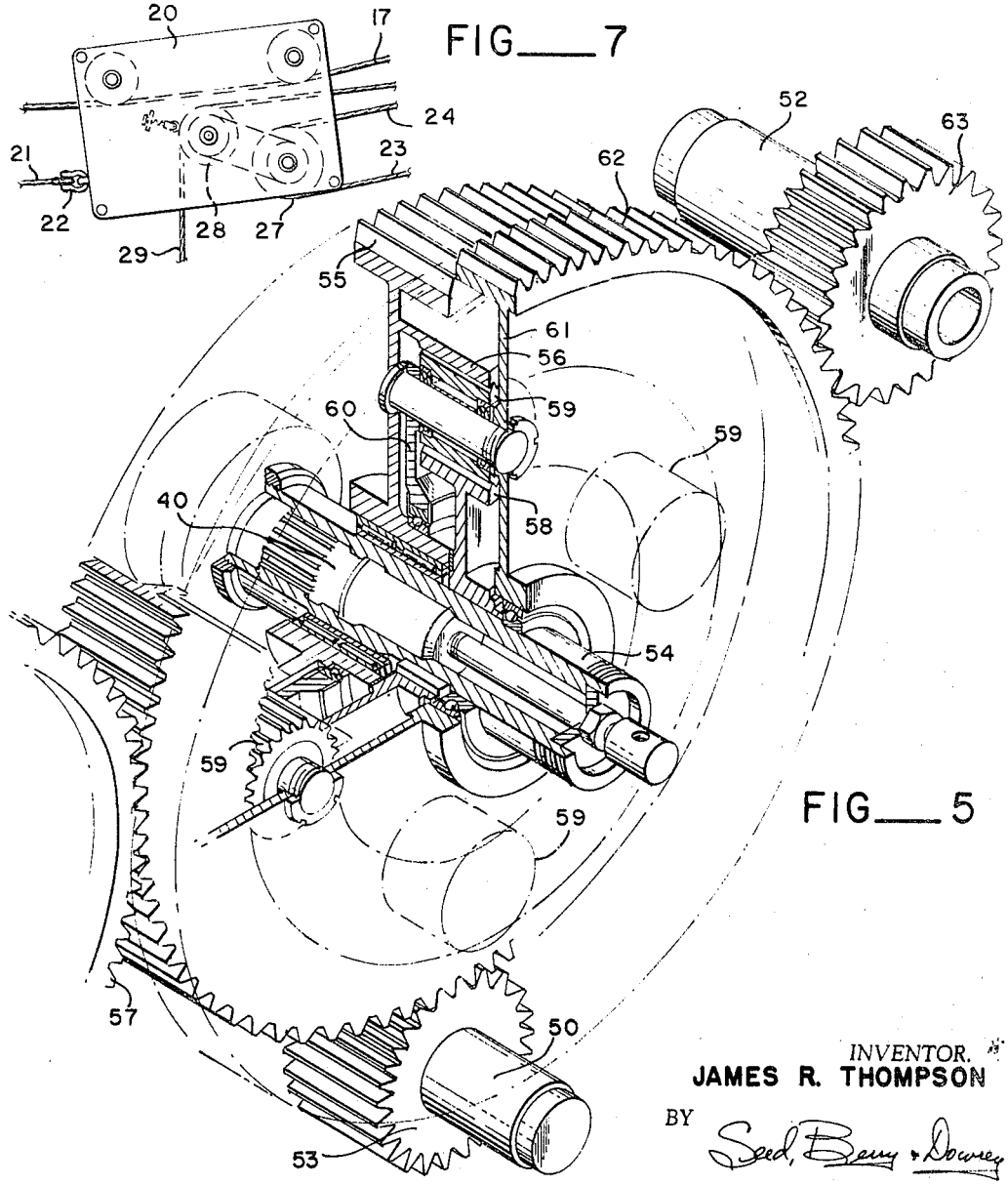
INVENTOR.
JAMES R. THOMPSON
BY
*Seed, Berry + Downey*
ATTORNEYS United States Patent Office 3,436,056
Patented Apr. 1, 1969

3,436,056
DRIVE SYSTEM FOR YARDER USED IN
DOUBLE MAIN LINE LOGGING
James R. Thompson, Seattle, Wash., assignor to Washington Iron Works, Seattle, Wash., a corporation of Washington
Filed Sept. 7, 1967, Ser. No. 666,098
Int. Cl. B66d 1/26
U.S. Cl. 254—185                    8 Claims

ABSTRACT OF THE DISCLOSURE

A drive system for a yarder having two main drums and a haulback drum and used with a skidder carriage in double main line skidder logging, permitting an operator to operate the main drums either independently of or together with the haul-back drum, the system obtaining counter rotations of the main drums in said independent operation and like rotation in the all-drive operation, and providing in the all-drive operation an infinite ratio between the speed of the haul-back drum and that of the main drums.

---

This invention pertains to a drive system for a yarder used in double main line skidder logging, namely logging in which a skidder carriage is hauled directively toward a landing yard by taking in on two joined sections of a main cable and pulled directively from the yard by taking in on a haul-back cable. A tag line depends from the carriage and is raised and lowered by taking in on one while paying out the other of the two main cable sections. Three powered spooling drums are carried on the yarder, each to accommodate a respective one of the two main cable sections and the haul-back cable.

The principal object of the present invention is to perfect the drive to the yarder's three spooling drums, providing an interlocked system by which an operator can operate his main drums either independently of the haul-back drum or together with such drum, with the main drums turning in counter directions of rotation, spooling function considered, when powered independently of the haul-back drum and in a like direction of rotation, one main drum relative to the other main drum, when all drums are being driven, and so that an infinite ratio as between the speed of the haul-back drum and the speed of the main drums is available to the operator when the three drums are all being powered. The import of said infinite ratio is that the haul-back cable and the two main cables can be maintained in a taut condition, regardless of the number of wraps on the drums, without any necessity to slip friction clutches which are engineered into the system.

Other objects and advantages of the invention, with the foregoing, will appear and be understood in the course of the following description and claims.

In the accompanying drawings:

FIGURE 1 is a perspective view fragmentarily illustrating a yarder embodying perferred teachings of the present invention.

FIG. 2 is an enlarged-scale fragmentary view, partly in horizontal section and partly in plan, detailing a part of the system including the haul-back drum.

FIGS. 3 and 4 are similar views each including a respective one of the two main drums and drawn to a somewhat larger scale.

FIG. 5 is a fragmentary perspective view, drawn to a yet larger scale, to detail the infinite-ratio portion of the drive system and shown partly in section, partly in elevation, and partly in phantom.

FIG. 6 is a somewhat schematic view showing the yarder in its working environment; and FIG. 7 is an elevational view detailing the carriage portion of the log-skidding system.

In said drawings, reference will first be had to FIGS. 6 and 7 for a description of a skidder system providing a suitable environment for the use of the yarder of the present invention. Denoted generally by the numeral 10, the yarder has a powered reversible drum 11 for spooling one end of a haul-back cable, and two powered reversible drums 13 and 14 for spooling respective free ends of two connected sections of a main cable. The haul-back line extends from the drum over a head-block 15 carried by a boom 16 of the yarder, and thence by a run 17 to a tail-block 18, taking a bight about the sheave of the latter. Said run 17 serves as a sky-line for the system, and a skidder carriage 20 tracks thereon.

From the tail-block the outer end of the haul-back line extends inwardly by a run 21 to the carriage 20 and is anchored thereto by a clevis 22.

Said two connected sections of the main cable are denoted by 23 and 24 and for purposes of distinction will be hereinafter termed the long section and the short section, respectively. Both sections extend from their respective drum over a head-block, as 25 and 26, carried by the boom 16. From the head-block 25, the long section runs to the carriage and takes a bight about a sheave 27 which is mounted thereon. The return end of the long section connects by a clevis with the outer end of the short section.

There is also mounted on the carriage a sheave 28 over which a tag line 29 passes. An inner end of the tag line connects with the main cable at the juncture of the two sections 23–24. The outer end hangs free and its fitted with a hook to accommodate a choker line or lines 30.

An operator, in order to let out the tag line so as to lower the hook into a position convenient to a ground crew, powers his two main drums 13 and 14 in functionally converse directions causing the long line 23 to be taken in while paying out the short line. After having attached the tag line to a log L, the choked end of the log is hoistered by powering the two main drums in directions opposite that of the lowering procedure, and namely so that the long line is payed out and the short line taken in. When the hoisted end is sufficiently high to clear ground obstructions, the operator starts the carriage on its "in-haul" travel by powering both main drums in directions causing each to take in on the concerned line while at the same time paying out from the haul-back drum at a line speed corresponding to a median of the line speeds of the two main cable sections. The line speeds, as between said two sections of the main cable, is usually the same, varying only where an operator, by slipping clutches, favors one or the other section in consequence of a need or desire to either raise or lower the tag line while the carriage is moving.

Proceeding now to describe the yarder, the three drums are tandem-mounted and cross-shafts 40, 41 and 42 therefor receive journal mountings from bearing assemblies 43 bolted to paralleling beams 44 of a suitable frame. Drums 11 and 13 are journaled for free rotation upon their shafts 40 and 41, and there is provided for each a clutch, as 45 and 46, operated by pressure air for coupling or uncoupling the drum to or from the shaft at will. Drum 14 is fixed to its shaft 42.

The power plant for the yarder passes its main power through a torque converter into a transmission, and from the transmission through a transfer case to a transverse drive shaft 50. The power plant also has a take-off driving a pump which is functional to a variable-speed reversible fluid motor 51. Said power plant, torque converter, transmission, transfer case, and pump are not here illustrated but their construction and mounting is or may be like or similar to that shown and described in my U.S. Patent No. 3,282,569, issued Nov. 1, 1966.

One end of each of the shafts 40, 41 and 50, and that of a shaft 52 driven from the motor 51 project outboard beyond one of the side beams of the yarder frame. For purposes of distinction these shaft ends will be hereinafter referred to as the near-side outboard ends. The other end of shaft 41 and a like end of shaft 42 project outboard beyond the other side beam and will be hereinafter referred to as the far-side outboard ends.

A pinion 53 is fixed to said near-side outboard end of the drive shaft 50 and meshes one of the two gears 55-56 of a 2-gear gear wheel journaled for rotation upon a hollow spindle 54 which is splined upon the near-side outboard end of the drum shaft 40. The gear 55 so driven has external teeth. The drive which it receives is also passed to a meshing gear wheel 57 splined upon the near-side outboard end of the main drum shaft 41. The other gear 56 of the 2-gear gear wheel presents internal teeth and functions as the ring gear for a planetary gear system including a sun gear 58, planetary gears 59, and a spider. The spider is comprised of two connected carrier plates 60 and 61 journaled for rotation upon the hollow spindle 54 at opposite sides of the sun gear. Said sun gear is keyed to the spindle, causing the sun gear and the drum shaft 40 to turn in unison.

Carrier plate 61 has external teeth upon its perimeter to produce a gear wheel. This gear wheel, denoted by 62, is meshed by a pinion 63 which is keyed or otherwise secured upon said shaft 52 driven from the reversible motor 51. Means are provided for passing drive from the main drum shaft 41 to the main drum shaft 42 either in a like or in a counter direction of rotation, selectively. To pass the drive in the same direction of rotation each said main drum shaft has carried upon its far-side outboard end a respective one of two sprocket wheels 64 and 65, and trained over the sprocket wheels is a drive chain 66. Sprocket wheel 64 is splined to its shaft. Sprocket wheel 65 is journaled upon the shaft and is selectively coupled to or uncoupled from the same by a clutch 67 operated by pressure air. The passing of drive in counter directions of rotation is afforded by meshed gear wheels 70 and 71. Like the sprocket wheels, the driving gear wheel is splined upon its shaft and the driven gear wheel is journaled upon its shaft and coupled to or uncoupled therefrom, selectively, by a clutch 72 operated by pressure air.

Each of the spooling drums has a brake drum fixed thereto. A suitable brake mechanism (not shown) under the control of the operator is provided for each such brake drum.

It will be seen that the driving gear 53 can be powered in either rotary direction, at will, and that the meshed gear wheels 55 and 57 rotate in unison therewith. The operator holds the carriage stationary by disengaging the clutches 45 and 72, the former of which isolates the haul-back drum from the driving gear. The tag-line is lowered by causing the driving gear to turn in a clockwise direction as viewed from the vantage point of FIGS. 1 and 5, and engaging the clutches 46 and 67, the former to couple the main drum 13 to the driving main shaft 41 and the latter to pass power through chain 66 from said driving main shaft to the driven main shaft 42. Main drum 14, which is splined to said driven main shaft, responsively takes in on the main cable section 23 while the main drum 13 pays out the main cable section 24. To raise the tag-line the operator performs the same clutch operation but causes the driving gear 53 to turn counter-clockwise.

Now to move the carriage in its haul-in direction, the driving gear 53 is powered in a counter-clockwise direction while disengaging the chain clutch 67 and engaging each of the other three clutches. The driving main shaft 41 consequently passes its drive to the driven main shaft through the meshed gears 70 and 71, whereupon both main drums take in on their cable sections 23-24 (drum 13 turning counter-clockwise and drum 14 clockwise). Coincident with the engagement of said three clutches, which in addition to a responsive powering of the main drums also acts through the planetary gearing and shaft 40 to power the haul-back drum so that the haul-back cable is paid out, the operator—by operation of the gear 63—controls the speed of the haul-back shaft 40 so that the speed at which the haul-back cable is payed out corresponds to the speed at which the two main cable sections are each being taken in. This perforce requires that the haulback drum turn slower than the double main drums when the wraps of cable upon the former have a diameter exceeding that of the latter, turn at the same speed when the diameters are the same, and turn faster when the diameter ratios favor the main drums. A spinning of the gear 63 at a speed such that the spider 60-61 turns in unison with the gear 55 causes the ring gear 56 to be locked to the sun gear 58. In this condition, assuming that the gear wheels 55 and 57 have the same number of teeth, the haul-back drum turns at the same speed as the main drums. Its speed can be increased and decreased, relative to the speed of the main drums, by increasing and decreasing, respectively, the speed of the spider relative to the speed of the gear wheel 55. The operator, through control of the speed of the reversible motor 51, is enabled to produce at will infinite ratios between the speed at which the double main drums 13-14 turn and that at which the haul-back drum 11 turns. There is no need to slip clutches in order to compensate the drums to changes in the number of cable wraps.

It is believed that the invention will have been clearly understood from the foregoing detailed description of my now-preferred illustrated embodiment.

The embodiments of the invention in which an exclusive property or privilege is claimed are defined as follows:

1. In a logging system employing a carriage of the type which tracks on a skyline, is fitted with a tag line, and is pulled directively from a landing yard by a haulback line and directively toward the landing yard by a double main line, the haulback line running from the landing yard through a tail block and thence back to the carriage, the double main line comprising a long section and a short section extending from the landing yard to the carriage and made continuous by having the outer end of the long section looped over a sheave which is mounted on the carriage and brought back and joined to the outer end of the short section, the tag line also passing over a sheave which is mounted on the carriage with one of its ends hanging free and the other end attached to the double main line at the point of juncture of said long and short sections, an interlocking yarder adapted to occupy the landing yard for controlling said several lines, said yarder comprising: three spooling drums one for the inner end of the haulback line and one each of the inner ends of the two sections of the double main line, respective shafts for said drums, a power plant, separate reversible drive systems from the power plant to (1) said haulback shaft and (2) one of said two main line shafts, one of said two shaft-driving systems being a planetary system including a sun gear, planetary gears, and spider, the planetary gear of said planetary system being meshed by a gear wheel driven from the power plant, the sun gear and the gear wheel comprising the output end and the input end, respectively, of the planetary drive system, power-driven means independent of the planetary drive system made functional to the spider component of the planetary drive system for either increasing or decreasing, at will, the ratio between the speeds at which the input and output ends of the planetary drive system turn, two independent driving connections from said plant-driven main-line shaft to the other of the two main-line shafts for passing rotation from the former shaft to the latter shaft and characterized in that one said driving connection causes the two shafts to rotate in a like direction and the other said driving connection causes the two shafts to rotate in opposite directions, and respective clutches for said two independent driving connections or making a selected one of the two driving connections operative at will.

2. An interlocking yarder according to claim 1 in which the planetary system is related to the haulback shaft.

3. An interlocking yarder according to claim 1 having a manually-controlled clutch for either coupling the haulback drum to or uncoupling the same from the haulback shaft at will.

4. An interlocking yarder according to claim 3 having a manually-controlled clutch for said main drum which is related to the one of said two main-line shafts driven from the power plant and permitting said drum to be coupled to or uncoupled from the shaft at will.

5. An interlocking yarder according to claim 1 in which the other of said two shaft-driving system includes two meshed gear wheels one of which is fixed to the related shaft and the other of which is fixed to the gear wheel which comprises the input end of the planetary drive system.

6. An interlocking yarder according to claim 1, one of said two independent driving connections comprising two meshed gear wheels one of which is fixed to one and clutch-coupled to the other of two main-line shafts, the other of said two independent driving connections comprising an endless chain trained about two sprocket wheels one of which is fixed to one and clutch-coupled to the other of the two main-line shafts, the clutches which provide the couples being the recited clutches which make the driving connections operative at will.

7. An interlocking yarder according to claim 2 in which the sun gear of the planetary drive system turns about the center of the haulback shaft as an axis and is coupled to the haulback drum by a manually controlled clutch.

8. An interlocking yarder according to claim 6 in which the shafts are journaled in bearing assemblies carried by two side beams of a frame structure, the haulback shaft and the driven one of the two main-line shafts each having one end thereof projecting outboard beyond one of the two side beams to receive the drive from the related drive system, the two main-lines shafts each having one end thereof projecting outboard beyond the other of the two side beams, said two driving connections between the main-line shafts being located one outboard and the other located inboard with respect to said last-named beam.

References Cited

UNITED STATES PATENTS 1,412,956    4/1922    Nelson _____ 254—185
2,221,359    11/1940    Nesbit _____ 254—185

EVON C. BLUNK, *Primary Examiner.*

H. C. HORNSBY, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,436,056                                                  April 1, 1969

James R. Thompson

It is certified that error appears in the above identified patent and that said Letters Patent are hereby corrected as shown below:

Column 4, line 56, "of the inner" should read -- for the inner --.
Column 5, line 4, "connections or" should read -- connections for --;
line 6, "1." should read -- 2. --.

Signed and sealed this 31st day of March 1970.

(SEAL)
Attest:

Edward M. Fletcher, Jr.                                WILLIAM E. SCHUYLER, JR
Attesting Officer                                                  Commissioner of Patents